(12) United States Patent
Tsai

(10) Patent No.: US 6,728,011 B1
(45) Date of Patent: Apr. 27, 2004

(54) METHOD OF ADJUSTING SCANNER MODULE AND DEVICE THEREOF

(75) Inventor: Jenn-Tsair Tsai, Taipei Hsien (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/427,981

(22) Filed: Oct. 26, 1999

(30) Foreign Application Priority Data

Nov. 9, 1998 (TW) .................................. 87118636 A

(51) Int. Cl.$^7$ ................................................. H04N 1/04
(52) U.S. Cl. ...................... 358/487; 358/504; 358/406; 235/462.11
(58) Field of Search ................................. 358/487, 474, 358/406, 482, 483, 494, 504; 235/462.11, 454

(56) References Cited

U.S. PATENT DOCUMENTS

| | | | | |
|---|---|---|---|---|
| 5,206,503 A | * | 4/1993 | Toops | .......................... 250/234 |
| 5,675,149 A | | 10/1997 | Wood et al. | ................. 250/332 |
| 5,680,255 A | | 10/1997 | Imanari | ....................... 359/701 |
| 6,219,463 B1 | * | 4/2001 | Hyodo | ......................... 382/298 |

* cited by examiner

*Primary Examiner*—Kimberly Williams
*Assistant Examiner*—Negussie Worku
(74) *Attorney, Agent, or Firm*—Ladas & Parry

(57) ABSTRACT

In the method of adjusting scanner photoelectric module, a reference pattern is projected to the charge-coupled device through a lens for generating image signal corresponding to the charge-coupled device. The lens and the charge-coupled device perform adjustment in accordance with the obtained image signal to improve MTF value and the magnification (or zooming) ratio. This invention provides a block at each of the two sides of the scan width of the reference pattern and two sets of line patterns between the scan widths of the reference pattern. The two blocks (such as right triangle blocks) are increasing/decreasing in their width and are symmetrical, and have a side at the vertical scan direction, for determining the margins and the horizontal status of said scanner photoelectric module. The two sets of line patterns are vertical and inclined at the scan direction, respectively, for determining the MTF value of the scanner photoelectric module along the scan direction and the vertical scan direction.

9 Claims, 5 Drawing Sheets

METHOD OF ADJUSTING SCANNER MODULE AND DEVICE THEREOF

BACKGROUND OF THE INVENTION

1. Field of the Invention

This invention relates to a method of adjusting scanner photoelectric module, particularly to a method of the adjusting the scanner photoelectric module (lens and charge-coupled device) to the favorable position and MTF through a change of the reference pattern.

2. Description of the Prior Art

Refer to FIGS. 1–4, which illustrate a method and system of adjusting the charge-coupling component and lens of the scanner module as specified in the Patent Publication No. 316969 of the Republic of China.

In FIG. 1, a scanner module 22 is first arranged an adjusting assembly platform 24 when lens 30 and the charge-coupled device 20 are adjusted. The charge-coupled device 20 is placed in front of the scanner module 22 through a holder 28, as shown in FIG. 2A. The holder 28 can move at X and Y directions and rotate at θ direction. The scanner module 22 further comprises: a light source 39, reflective mirrors 31, 33, and 35, and lens 30, as shown in FIG. 2B.

FIG. 3 is a reference pattern for adjusting the positioning. In the figure, the triangular patterns 422 and 45 determine the horizontal status of the charge-coupled device; the lateral straight lines 40 determine the scan margin of the charge-coupled device, and the parallel lines 44 determine the MTF of the scanner optical module 22 at the scan direction. Refer to FIG. 4 for the image signals the charge-coupled device module obtains in accordance with said reference pattern. Therein, x corresponds to the distance from the origin of the coordinate to the left straight line 40, y1 and y2 correspond to the sectional distance from the triangles 42 and 45 to the scan line, while f corresponds to the parallel line 44. When x is too large or small, it denotes the reference pattern is not projected to the center of the scan range of the charge-coupled device 20; therefore, adjustment of the charge-coupled device 20 needs to be made at X direction. When the average of y1 and y2 is too large or small, it denotes the position is too low or too high for the charge-coupled device 20 to scan the reference pattern (when the scan position is high, the sectional distance from the triangles 42 and 45 to the scan line increases; conversely, when the scan position is low, the sectional distance from the triangles 42 and 45 to the scan line decreases). Therefore, adjustment of the charge-coupled device 20 needs to be made at Y direction. When y1≠y2, it denotes the charge-coupled device 20 scan the reference pattern slantingly (when the scan lines incline, the triangles 42 and 45 will scan the top and bottom parts or the bottom and top parts to make the corresponding sectional distances uneven). Therefore, adjustment of the charge-coupled device 20 needs to be made along θ direction to resume to the horizontal status.

Moreover, the MTF value can be obtained in accordance with f signal of the reference signal. However, since the MTF value is represented in the absolute value, only the minimum at the X direction can be adjusted. When the optimal MTF value does not appear at X direction and Y direction, incidents such as good MTF at X direction but bad MTF at Y direction, or bad MTF at X direction but good MTF at Y direction might result.

Further, it becomes cumbersome to determine the margins and the horizontal status of the two patterns (straight lines and triangle), respectively. Also, mistakes may incur as a result of determining the margins with straight lines.

SUMMARY OF THE INVENTION

Accordingly, the primary object of this invention is to provide a method of adjusting scanner photoelectric module, the reference pattern being used comprises a straight line pattern vertical to the scan direction and a straight line pattern diagonal to the scan direction. Consequently, the MTF at either X direction or Y direction can be simultaneously read out by the signal corresponding to the charge-coupled device 20, and the optimal MTF can be rendered in combination with the adjustment of the MTF at X direction and Y direction to the minimum.

Moreover, this invention can also combine straight lines and triangular patterns of the reference pattern for obtaining the scan margins and the horizontal status of the charge-coupled device with the same pattern, so misreading due to extremely thin straight lines can be avoided.

In the method of adjusting scanner photoelectric module, a reference pattern is projected to the charge-coupled device through a lens for generating image signal corresponding to the charge-coupled device. The lens and the charge-coupled device perform adjustment in accordance with the obtained image signal to improve MTF value and the magnification (or zooming) ratio. This invention is characterized in providing a block at each of the two sides of the scan width of the reference pattern and two sets of line patterns between the scan widths of the reference pattern. The two blocks (such as right angle blocks) are increasing/decreasing in their width and are symmetrical, and have a side at the vertical scan direction, for determining the margins and the horizontal status of said scanner photoelectric module, for determining the margins and horizontal status of the scanner photoelectric module and for preventing misjudgment of straight lines.

Moreover, this invention also provides a device of adjusting scanner photoelectric module, wherein, the reference pattern comprises in its scan width a straight line pattern vertical to the scan direction, a slant line pattern and a width-increasing/-decreasing, symmetrical block and a side vertical to the scan direction on each of the two sides of the scan width. The reference pattern is projected to the charge-coupled device through the lens of the scanner photoelectric module for generating an image signal corresponding to the charge-coupled device. The driving device then adjusts the position and the MTF of the lens and the charge-coupled device in accordance with the image signal.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE EMBODIMENTS

Figure 1:
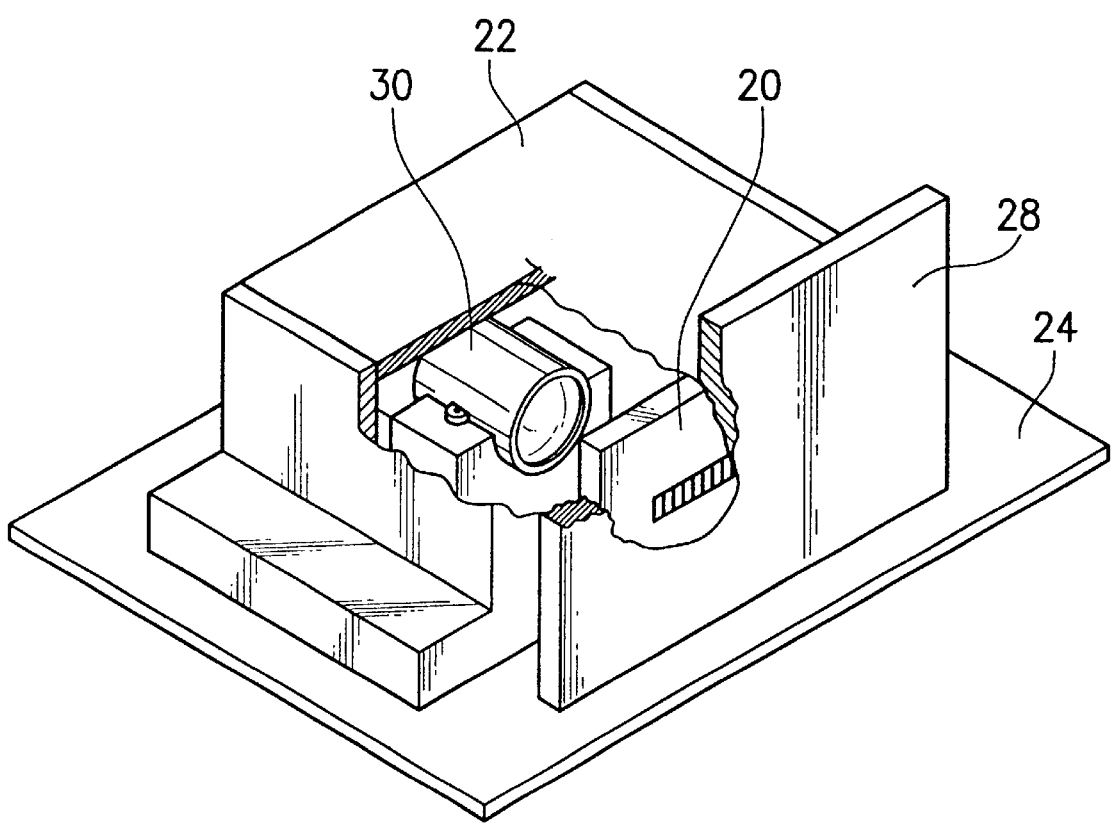
FIG. 1 is a diagram illustrating the relation between a harge-coupled device module and a frame body in a conventional canner adjustment system.
Figure 2A:
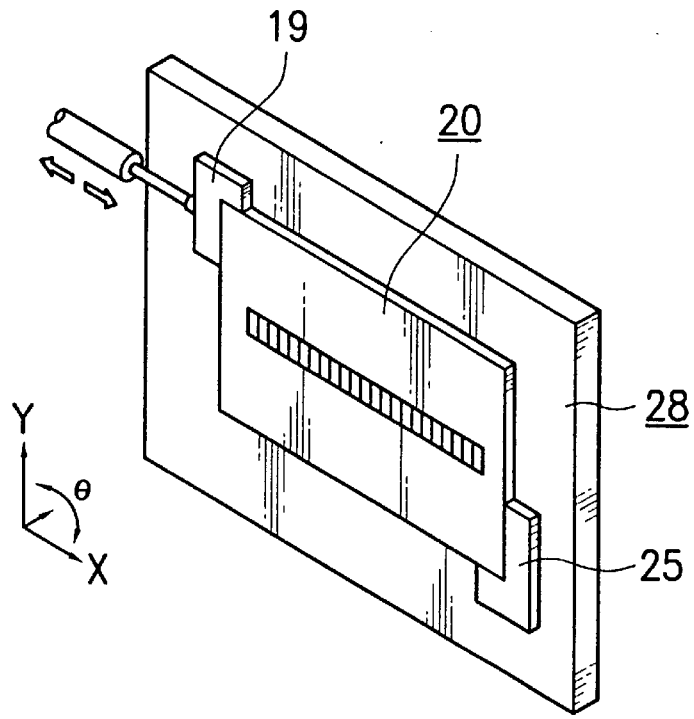
FIGS. 2A and 2B are diagrams illustrating the relation among a holder, a lens, and a frame body in a conventional scanner adjustment system.
Figure 2B:
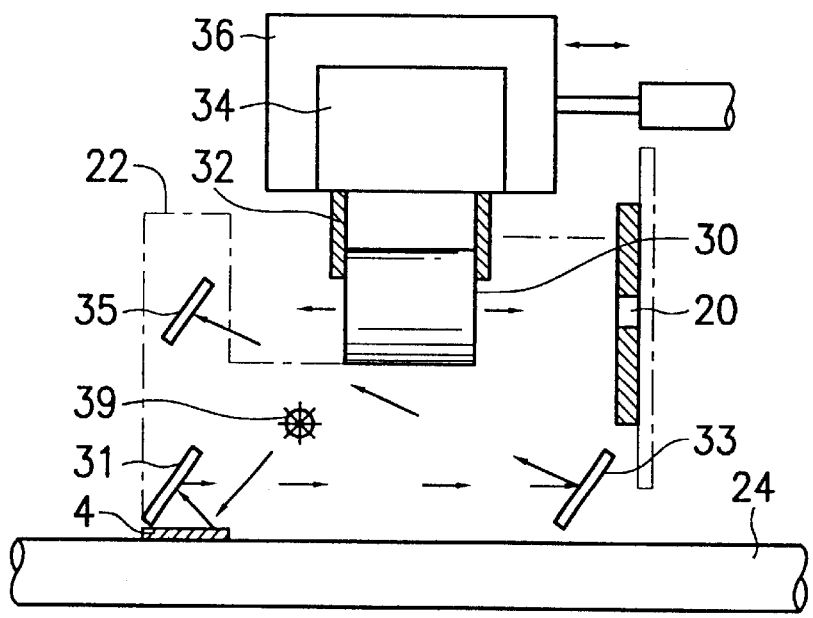
Figure 3:
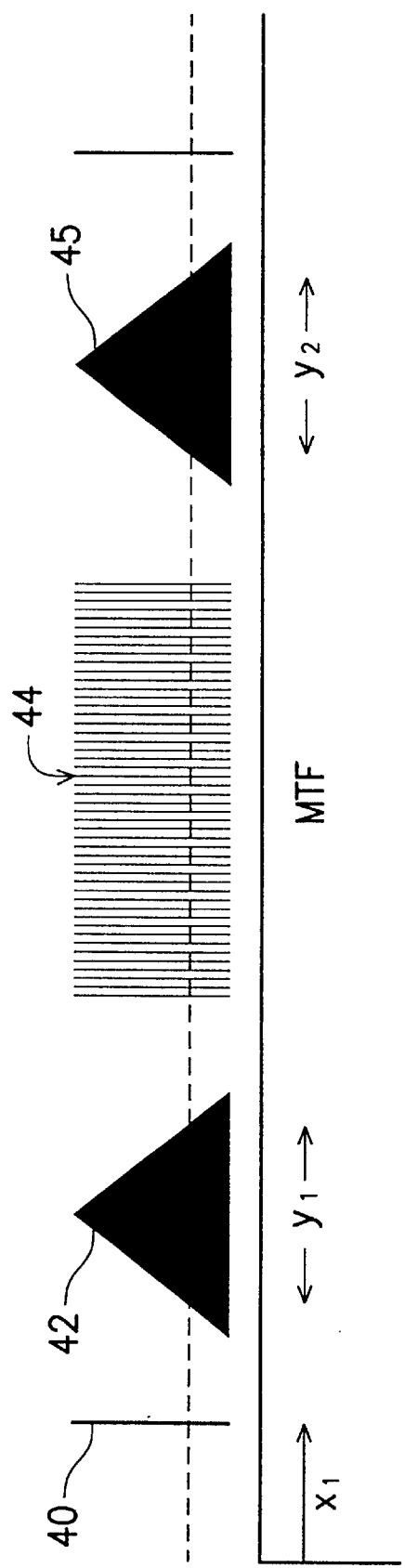
FIG. 3 illustrates reference patterns for a conventional scanner adjustment system.
Figure 4:
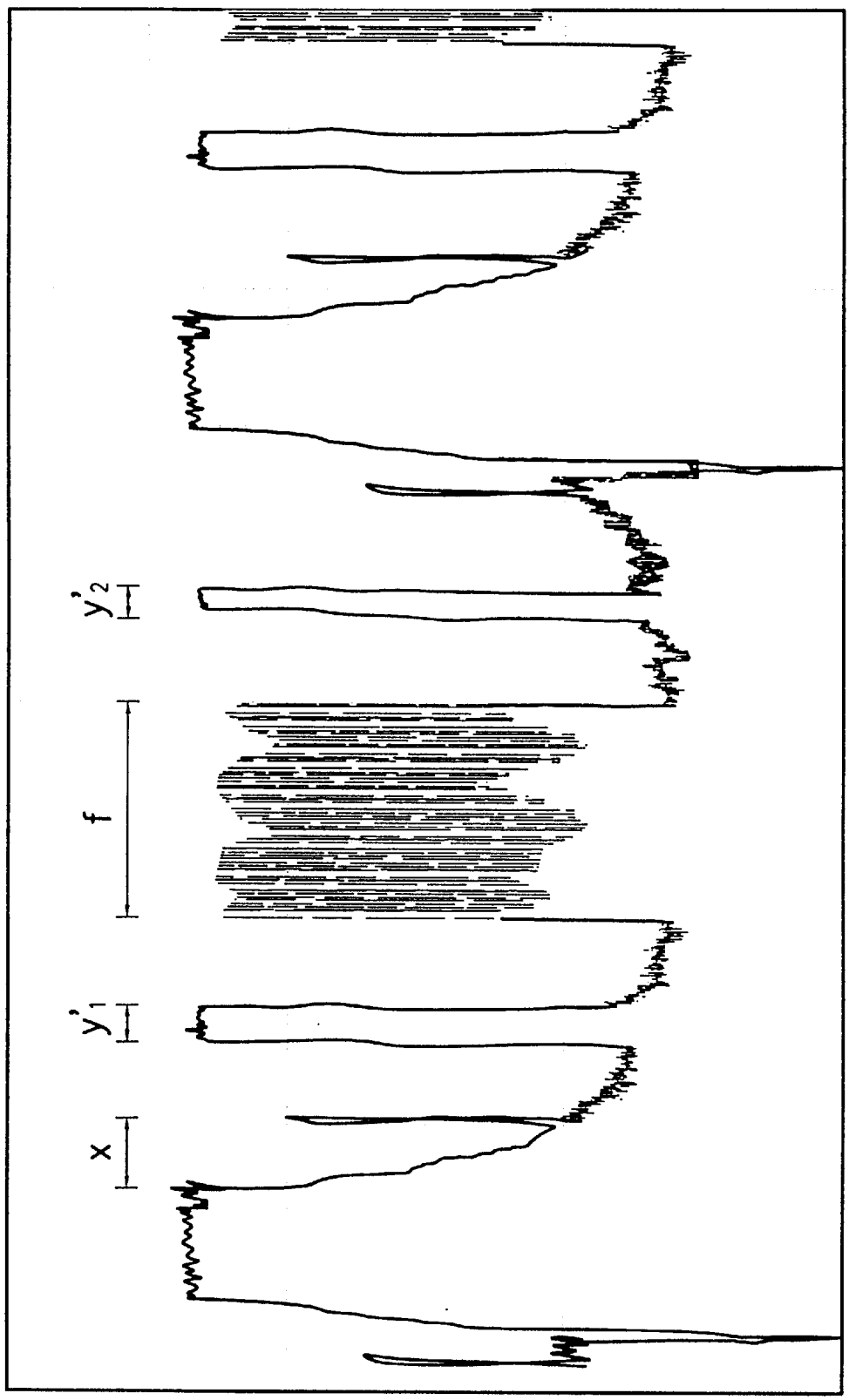
FIG. 4 illustrates the image signals obtained by the charge-coupled device module of conventional scanner after inputting the reference scan pattern of FIG. 3.
Figure 5:
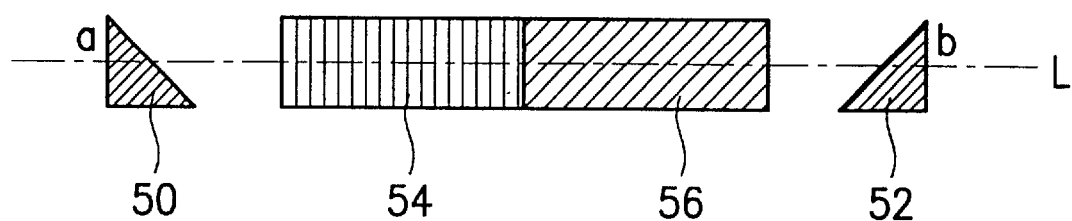
FIG. 5 illustrates the reference pattern used in the method of adjusting the scanner photoelectric module of this invention.

Refer to FIG. 5 for the reference pattern used in the method of adjusting the scanner photoelectric module of this invention; wherein, the scan margins are points a and b, and the scan range is between point a and point b. A right triangle 50 or 52 is formed on each of the two sides of the scan width. The two triangles are symmetrical and each of them comprises a side vertical to the scan direction L. The scan width comprises a straight line pattern 54 and a slant line pattern 56.

Figure 6:
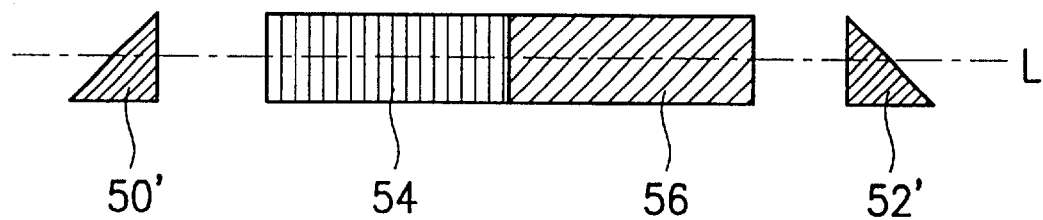
FIG. 6 illustrates another reference pattern used in the method of adjusting the scanner photoelectric module of this invention.

FIG. 6 illustrates another reference pattern used in the method of adjusting the scanner photoelectric module of this invention; wherein, the right triangles 50' and 52' face against each other, rather than face toward each other in FIG. 5.

Figure 7:
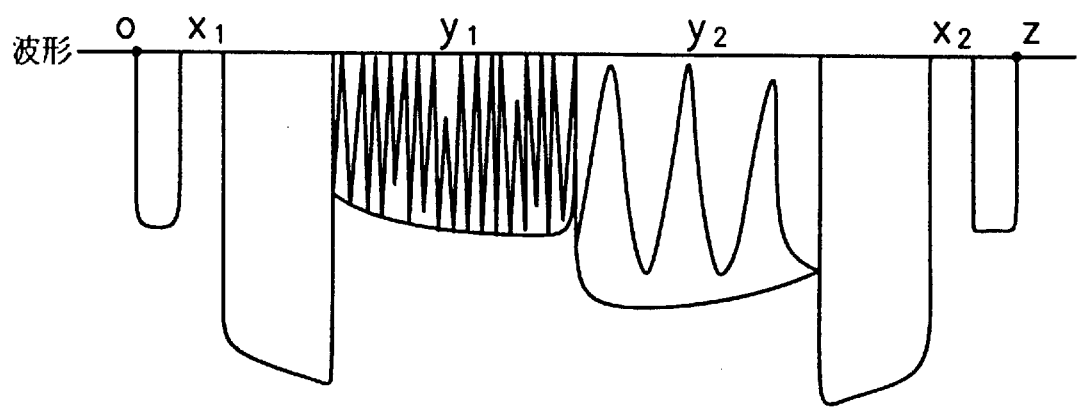
FIG. 7 illustrates the image signals obtained by the charge-coupled device in accordance with the reference pattern of FIGS. 5 and 6.

When the reference pattern is projected to the charge-coupled device through the lens of the scanner photoelectric module, the charge-coupled device generates a corresponding reference pattern. FIG. 7 illustrates the image signals obtained by the charge-coupled device in accordance with the reference pattern of FIGS. 5 and 6. Therein, the length x1 of the image signal corresponds to the sectional distance between the scan line L and the reference pattern of the reference triangles 50 and 50'; the length of x2 corresponds to the sectional distance between the scan line L and the reference pattern of the reference triangles 52 and 52'; area fx corresponds to the straight line pattern 54 of the reference pattern vertical to the scan direction; and area fy corresponds to the slant line pattern 56 of the reference pattern vertical to the scan direction Next, the lens and the charge-coupled device perform adjustment in accordance with the output image signal.

First, adjust the charge-coupled device, for ensuring the image signal corresponding to the reference pattern to be within the scan range of the charge-coupled device. In this case, since the reference pattern has two sides, with each side comprising a symmetrical right triangle 50(50') or 52(52') at the scan margins (point a and point b) and being vertical to the scan direction, the adjustment can be obtained directly from the position corresponding to the image signal in the right triangle 50(50') or 52 (52') along the horizontal direction (that is, X direction). If the image signal is not within the scan range (between points a and b) of the charge-coupled device, then the charge-coupled device needs to perform a horizontal adjustment. Otherwise, the image signal is already within the scan range of the charge-coupled device.

Further, adjust the horizontal status of the charge-coupled device, for ensuring the sectional distances x1 and x2 from the triangular patterns 50(50) and 52(52') to the scan line L are equal, or their difference is smaller than an acceptable error value $\Delta x$. If the difference of the sectional distances x1 and x2 from the triangular patterns 50(50) and 52(52') to the scan line L are equal or larger than the acceptable value $\Delta x$, then the charge-coupled device needs to make adjustment in inclination. Otherwise, the charge-coupled device is already at the horizontal status.

Next, adjust the lens along the optical axle (Z direction), for ensuring the optimal equilibrium of the MTF at X direction and Y direction is reached. In conventional methods, the MTF is represented in absolute value, and the result of the adjustment is not promising; only the minimum horizontal standard is promised. Consequently, this invention provides a straight line pattern 54 vertical to the scan direction and a slant line pattern 56 diagonal to the scan direction in the reference pattern, for rendering the MTF at the X direction and the Y direction, and for adjusting it to the optimal equilibrium. The optimal equilibrium is obtained and realized by: adjusting the lens along the optical axle to ensure the MTFs at X direction and at Y direction are becoming approximate.

Furthermore, this invention also provides a device for adjusting scanner photoelectric module using the aforementioned method of adjustment. Therein, the reference pattern comprises in its scan width a straight line pattern vertical to the scan direction, a slant line pattern and a width-increasing/-decreasing, symmetrical block and a side vertical to the scan direction on each of the two sides of the scan width. The reference pattern is projected to the charge-coupled device through the lens of the scanner photoelectric module for generating an image signal corresponding to the charge-coupled device. The driving device then adjusts the position and the MTF of the lens and the charge-coupled device in accordance with the image signal. In this example, the adjustment of the charge-coupled device and the lens can be made in any manner, such as driven by motor or driven manually.

Since the method of adjustment is the same as previously specified, its description is thereby omitted.

To summarize, in the method of adjusting scanner photoelectric module of this invention, the reference pattern comprises both a straight line pattern vertical to the scan direction and a straight line pattern diagonal to the scan direction. Consequently, the MTF at either X direction or Y direction can be simultaneously read out by the signal corresponding to the charge-coupled device 20, and the optimal MTF can be rendered in combination with the adjustment of the MTF at X direction and Y direction to the minimum. Moreover, this invention can also combine straight lines and triangular patterns of the reference pattern for obtaining the scan margins and the horizontal status of the charge-coupled device with the same pattern, so misreading due to extremely thin straight lines can be avoided.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of adjusting scanner photoelectric module having a charge-coupled device and a lens, comprising the following steps:

protecting a reference pattern to the charge-coupled device through the lens for generating an image signal corresponding to the charge-coupled device;

determining a value of MTF of said scanner photoelectric module in a horizontal direction and a vertical direction; and determining margins and a horizontal status of said scanner photoelectric module;

wherein said reference pattern comprises a first line set having a plurality of parallel straight lines vertical to the scan direction of said scanner photoelectric module and a second line set having a plurality of parallel slant lines diagonal to the scan direction of said scanner photoelectric module, and the first line set and the second line set are on the same plane parallel to the scan direction; and said reference pattern further comprises two blocks being respectively and symmetrically configured on each of the two sides thereof, the blocks being increasing/decreasing in width, with one side vertical to the scan direction.

2. The method of adjusting scanner photoelectric module of claim 1, wherein said width-increasing/-decreasing block is a right triangular block, having a side of right angle vertical to the scan direction of said scanner photoelectric module.

3. A device of adjusting scanner photoelectric module, comprising:

a reference pattern, having a straight line pattern vertical to the scan direction and a slant line pattern diagonal to the scan direction, and a block at each of the two sides of the scan width; said block being increasing/decreasing in width and being symmetrical and comprising a side vertical to the scan direction;

a scanner photoelectric module, comprising a lens and a charge-coupled device, with said reference pattern being projected to said charge-coupled device and generating an image signal corresponding to said charge-coupled device; and a driving device, for adjusting said lens and said charge-coupled device in accordance with said image signal.

4. The adjustment device of scanner photoelectric module of claim 3, wherein, said block is a right triangular pattern.

5. A method of adjusting a scanner photoelectric module, comprising the steps of:

providing a reference pattern having a first zone with a non-uniform measurement in a first axial direction, a second zone symmetrical to the first zone, a first set of parallel lines perpendicular to the first axial direction, and a second set of parallel lines slant with respect to the first axial direction, wherein the first set of parallel lines and the second set of parallel lines are located between the first zone and the second zone, and the first axial direction is perpendicular to an edge of the first zone; and scanning the reference pattern by the scanner photoelectric module in the first axial direction, wherein first image resolution of the scanner photoelectric module in the first axial direction and second image resolution of the scanner photoelectric module in a second axial direction perpendicular to the first axial direction are determined by scanning the first set of parallel lines and the second set of parallel lines, and scanning margins of the scanner photoelectric module and inclination of the first axial direction to a horizontal line are determined by the first zone and the second zone.

6. The method of adjusting a scanner photoelectric module as claimed in claim 5, wherein each of the first zone and the second zone is a right triangular pattern with one side parallel to the first axial direction and another side parallel to the second axial direction.

7. The method of adjusting a scanner photoelectric module as claimed in claim 5, wherein the first image resolution of the scanner photoelectric module in the first axial direction and the second image resolution of the scanner photoelectric module in the second axial direction are determined by values of MTF obtained by scanning the first set of parallel lines and the second set of parallel lines.

8. A device of adjusting scanner photoelectric module comprises;

A reference pattern having a first zone with a non-uniform measurement in a first axial direction, a second zone symmetrical to the first zone about a second axial direction perpendicular to the first axial direction, a first set of parallel lines perpendicular to the first axial direction, and a second set of parallel slant with respect to the first axial direction, wherein the first set of parallel lines and the second set of parallel lines are located between the first zone and the second zone, and the first axial direction is perpendicular to an edge of the first zone;

A scanner photoelectric module having a charge-coupled device and a lens, wherein the reference pattern is projected to the charge-coupled device through, the lens so as to generate an image signal;

A driving device for adjusting the charge-coupled device and the lens in accordance with the image signal.

9. The device of adjusting scanner photoelectric module as claimed in claim 8, wherein each of the first zone and the second zone is a right triangular pattern with one side parallel to the first axial direction and another side parallel to the second axial direction.

* * * * *